Aug. 14, 1951 E. A. EBERT 2,563,825
ARTIFICIAL FISH LURE AND METHOD OF MAKING THE SAME
Filed June 24, 1947

INVENTOR
Edward A. Ebert

Patented Aug. 14, 1951

2,563,825

UNITED STATES PATENT OFFICE 2,563,825

ARTIFICIAL FISH LURE AND METHOD OF MAKING THE SAME

Edward A. Ebert, Snyder, N. Y.

Application June 24, 1947, Serial No. 756,629

4 Claims. (Cl. 43—42.29)

This invention relates to artificial fish lures and method of making the same, and more particularly to an improved lure which is impaled upon a fish hook in the same manner as pork rind is used.

Natural pork rind has some objectionable features, such as being greasy, which causes it to pick up dirt while being used, causing a graying of its natural white color and making it less efficient in attracting fish. Also pork rind is put up in jars in a solution of brine which becomes smelly and sooner or later corrodes through the cover of the jar and gets into the tackle box and causes rusting of metal parts which it contacts. Pork rind must also always be kept moist. If left on the hook and permitted to dry in the sun, it becomes dark and hard, necessitating its removal and application of a new rind for further fishing.

According to my invention I have provided a fish lure which overcomes all the above objections and which embodies certain advantages over prior lures.

Among the objects of my invention may be mentioned the following:

To provide a lure having a more life-like action and appearance than pork rind.

To provide a lure for which no preservative or container is necessary and which can be used over and over again.

To provide a lure which stays clean when in use and is not materially affected by sunlight, oil, salt water, etc.

To provide a lure which can easily be made in many attractive color combinations.

To provide a lure which is readily attachable to and detachable from a hook without extra parts other than the lure itself.

To provide a lure and method of making the same which is simple in construction and operation and low in cost.

To provide a lure which may be left on a fish hook indefinitely without ill effect to either the lure or the hook.

The features of novelty which I believe to be characteristic of my invention are set forth with particularity in the appended claims. My invention itself, however, both as to its fundamental principles and as to its particular embodiments, will best be understood by reference to the specification and accompanying drawing, in which:

Figure 1:
Fig. 1 is a top plan view of a lure embodying my invention.
Figure 2:
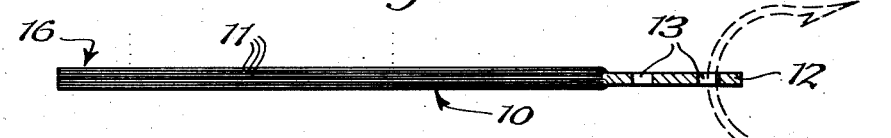
Fig. 2 is a section thereof, on line 2—2, Fig. 1, showing the lure impaled on a fish hook, shown in broken lines.
Figure 3:
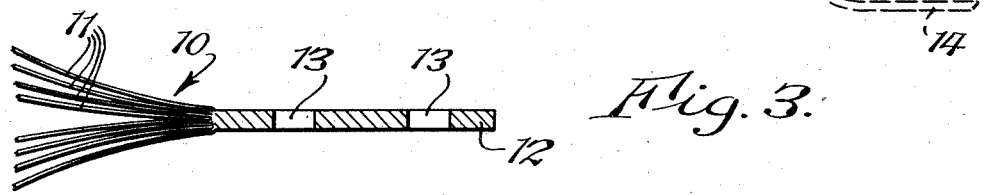
Fig. 3 is a fragmentary enlarged section thereof, similar to Fig. 2, showing how the laminations tend to separate.

The form of the invention illustrated in the first three Figures 1, 2 and 3, comprises a laminated body, generally indicated by the numeral 10 comprising plies 11 preferably made of thin polyvinyl plastic sheet material because of its toughness and thermoplastic qualities, but other similar materials such as rubber might be used. Materials such as "Krene" and "Saran" have been used successfully. The plastic known as "Krene" is a vinyl chloride-acetate copolymer while "Saran" is a thermoplastic, vinylidene chloride.

At their head end 12 the many plies are pressed together under heat so that they fuse together and become one integral mass. One or two, preferably two, slits 13 are provided in this head end 12 for the insertion of a fish hook 14, shown in dotted lines in Fig. 2. Either single or double hooking may be used, or if one of the slits 13 should be torn out, the other is still available. Hooking is accomplished by merely inserting a hook in one of the slits. Detachament is accomplished easily, only when the slit 13 is in line with the barb of the hook and the material is slightly stretched in the direction of the barb, the tail or trailing end may have one or more cuts 17 to break up this end into many trails 18. If eight plies 11 are used and two cuts 17 are made in the tail 16, the lure would have twenty-four ribbons on trails 18. I prefer to cut these trails 18 in a wavy pattern as shown in Fig. 1, for the reason that this wavy form gives the impression of motion and much greater action or movement of the trails is obtained when the lure is drawn through the water. This lure, if attached to an artificial bait or spoon is given additional action by movements of the artificial bait.

In Fig. 3, the plies 11 are shown to separate or fan out from the head end 12. This is caused by the reduction in thickness of the head end 12 when it is subjected to heat and pressure when the plies 11 are being welded together. This separation is desirable to permit water to get between the plies 11 for more showy action when the lure is in use.

Although Figs. 1 and 2 show the lure and its trails 18 in a more or less mechanical parallelism for clearness in the drawing, in actual use these trails 18 intermingle and fan out in a jumbled wavy manner. In use, the sinuous wavy trails in action simulate some form of live food for the fish.

It has been found that the slits 13 quite effectively retain the lure on a hook of almost any size because of the elasticity of the material and the hugging action of the edges of the slits 13 on the sides of the hook.

Figure 4:
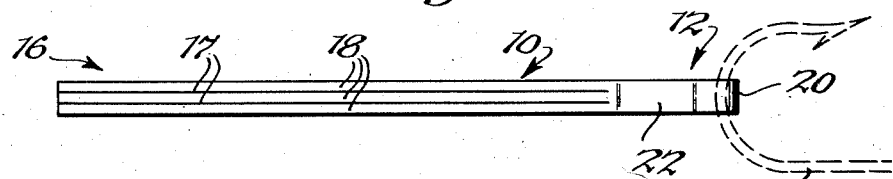
Fig. 4 is a top plan view of another lure having a different method of attachment to a fish hook.
Figure 5:
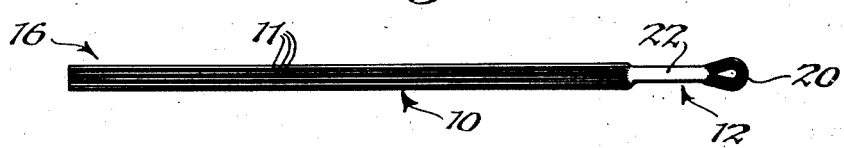
Fig. 5 is a side elevation of the form of invention shown in Fig. 4.

The form of the invention shown in Figs. 4 and 5 is similar to the form just described except that the trails 18 are cut straight and a different form of head 12 is employed. A loop 20 is provided for mounting the lure 10 on the hook 14, shown in broken lines in Fig. 4. This is made by folding the laminations 11 double and then heat-sealing a portion 22 back a short distance from the head end to provide the proper size of loop 20.

Although the trails in this form of the invention in Figs. 4 and 5 are straight, as mentioned before, the trails fan out when in use, and this lure is effective in catching fish.

In Figs. 1, 2 and 3, the plies 11 lie in planes substantially at right angles to the hook 14, i. e., the plies are horizontal when the hook is vertical. In Figs. 4 and 5, both the plies 11 and the hook 14 lie in substantially the same plane. Thus if the spoon or plug mounting the hook 14 wiggles from side to side horizontally, much greater action of the form shown in Figs. 1 to 3 will result, since the plies 11 are then caused to cut through the water edgewise which tends to separate the plies and make them flutter. If the hook 14 in Fig. 4 wobbles vertically up and down greater action will be caused in this lure.

Comparative tests were made with this lure and with the regular natural pork rind and more strikes were gotten with this lure, probably because it was used in color combinations while the pork rind was natural color. Also it was found that there was no tendency for this material to pick up foreign matter, such as mud, etc., and become discolored like the natural pork rind does.

Many pleasing color combinations may be had by the inclusion of one or more plies 11 of a different color before the heat-sealing of the head end 12.

I have found that a very simple way to make the above lure is to double over several plies of thermo-plastic material and heat-seal them at their head end 12 and then slice off the lures as shown in Fig. 4, or cut off with a die, units such as shown in Fig. 1, the die also making the slits 13 in its one movement. By cutting or shearing the lures from long strips of material, it is possible to produce them at reasonable cost.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention and preferred method of making the same, it will be understood that modifications and changes may be made without departing from the spirit and scope thereof, as will be clear to those skilled in the art.

I claim as my invention:

1. A lure for attachment to a fish hook, comprising a plurality of substantially identical elongated flat strips of flexible plastic material arranged face to face in register with one another, said strips having their opposite faces united at one end of the lure to provide an integral unitary head and a plurality of free rails projecting outwardly from said head, and said head being provided with a through opening extending transversely of said faces and adapted to receive said fish hook.

2. A lure for use with a fish hook, comprising a plurality of substantially identical elongated flat strips of flexible thermoplastic material arranged face to face in register with each other and each of said strips having wavy longitudinal edges and a head end and a tail end, a fusion connection uniting the opposing faces of said head ends only of said strips to provide an integral homogeneous head end, and said tail ends being provided with spaced wavy longitudinal cuts extending from the free extremities thereof substantially to said head to provide a multiplicity of trails having undulating edges streaming from said integral homogeneous head and free for individual transverse darting and twisting movement when the lure is drawn by said head through water.

3. A lure for use with a fish hook, comprising a plurality of substantially identical elongated flat strips of flexible thermoplastic material arranged face to face in register with each other and each of said strips having wavy longitudinal edges and a head end and a tail end, a fusion connection uniting the opposing faces of said head ends only of said strips to provide an integral homogeneous head end, said tail ends being provided with spaced wavy longitudinal cuts extending from the free extremities thereof substantially to said head to provide a multiplicity of trails having undulating edges streaming from said integral homogeneous head and free for individual transverse darting and twisting movement when the lure is drawn by said head through water, and said head being provided with a through slit extending transversely of said faces and lengthwise of said strips for attachment of the lure to said fish hook.

4. The method of making lures for use with fish hooks, which comprises arranging a group of sheets of flexible thermoplastic material in face to face relation, applying heat and pressure to opposite faces of said group of sheets along a restricted area thereof to provide a body in which all of said sheets are thermally bonded along said area to provide an integral homogeneous head section from which the unbonded areas of said sheets extend as separate plies, and cutting said group of sheets transversely of said area from the free edges of said plies to said thermally bonded area and at intervals through said thermally bonded area to provide a plurality of individual lures each having an integral, homogeneous, fused head section and a multiplicity of trails streaming from said head free for individual movement when the lure is drawn by said head through water.

EDWARD A. EBERT.

REFERENCES CITED

The following references are of record in the file of this patent:

UNITED STATES PATENTS

| Number | Name | Date |
| --- | --- | --- |
| 815,199 | Monetti | Mar. 13, 1906 |
| 1,272,183 | Arnold | July 9, 1918 |
| 1,324,825 | Isaacs | Dec. 16, 1919 |
| 1,851,529 | Stapf | Mar. 29, 1932 |
| 2,069,964 | Miller | Feb. 9, 1937 |
| 2,111,020 | Arbogast | Mar. 15, 1938 |
| 2,161,094 | Saunders, Jr. | June 6, 1939 |
| 2,208,827 | Accetta | July 23, 1940 |
| 2,344,457 | Christ | Mar. 14, 1944 |
| 2,434,541 | Bierer | Jan. 13, 1948 |
| 2,438,156 | Dodge | Mar. 23, 1948 |

Certificate of Correction

Patent No. 2,563,825 August 14, 1951

EDWARD A. EBERT

It is hereby certified that error appears in the printed specification of the above numbered patent requiring correction as follows:

Column 2, line 35, for "on" read *or*; column 3, line 71, for "rails" read *trails*;

and that the said Letters Patent should be read as corrected above, so that the same may conform to the record of the case in the Patent Office.

Signed and sealed this 16th day of October, A. D. 1951.

[SEAL]

THOMAS F. MURPHY,
*Assistant Commissioner of Patents.*